(12) United States Patent
Teyssedre

(10) Patent No.: US 7,582,582 B2
(45) Date of Patent: Sep. 1, 2009

(54) COMPOSITION FOR GRAY SILICA-SODIUM CALCIC GLASS FOR PRODUCING GLAZING

(75) Inventor: Laurent Teyssedre, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 627 days.

(21) Appl. No.: 10/542,925

(22) PCT Filed: Jan. 22, 2004

(86) PCT No.: PCT/FR2004/000150

§ 371 (c)(1),
(2), (4) Date: Nov. 17, 2005

(87) PCT Pub. No.: WO2004/067461

PCT Pub. Date: Aug. 12, 2004

(65) Prior Publication Data

US 2006/0240969 A1    Oct. 26, 2006

(30) Foreign Application Priority Data

Jan. 24, 2003    (FR) .................................. 03 01164

(51) Int. Cl.
C03C 3/087    (2006.01)
(52) U.S. Cl. .......................................... 501/71; 501/70
(58) Field of Classification Search .................. 501/70, 501/71
See application file for complete search history.

(56) References Cited

U.S. PATENT DOCUMENTS

| 3,326,715 A | 6/1967 | Twells |
| 5,656,560 A * | 8/1997 | Stotzel et al. ................. 501/72 |
| 5,888,917 A | 3/1999 | Kawaguchi et al. |
| 6,475,626 B1 | 11/2002 | Stachowiak |
| 2004/0171473 A1 | 9/2004 | Teyssedre |

OTHER PUBLICATIONS

U.S. Appl. No. 10/508,005, filed Sep. 24, 2004, Teyssedre et al.
U.S. Appl. No. 10/593,329, filed Sep. 19, 2006, Teyssedre et al.

* cited by examiner

Primary Examiner—Jerry Lorengo
Assistant Examiner—Elizabeth A Bolden
(74) Attorney, Agent, or Firm—Oblon, Spivak, McClelland, Maier & Neustadt, P.C.

(57) ABSTRACT

The invention relates to a gray soda-lime silicate glass composition which comprises the following coloring agents with contents varying within the following weight limits:

| $Fe_2O_3$ (total iron) | 0.01 to 0.14% |
| CoO | 40 to 150 ppm |
| NiO | 200 to 700 ppm | the NiO/CoO weight ratio being between 3.5 and 6 and the glass having an overall light transmission ($TL_{D65}$) under illuminant $D_{65}$ of between 20 and 60% measured for a thickness of 6 mm. The invention also relates to a glass sheet, optionally thermally toughened, obtained from the aforementioned composition and glazing comprising at least one of these sheets, especially for buildings.

23 Claims, No Drawings

COMPOSITION FOR GRAY SILICA-SODIUM CALCIC GLASS FOR PRODUCING GLAZING

The invention relates to a soda-lime silicate glass composition of gray color, in particular for producing flat glass by the float process on a bath of molten metal, such as tin, or by rolling, this glass being intended to form windows for the building and automobile industries.

Bulk-tinted gray glass is generally sought after for its esthetic character and for the specific properties that it may have, especially protective properties as regards solar radiation.

In the building field, such glass is used in particular for glazing buildings located in regions exposed to strong sunlight, but can also be employed for decoration, for example in the form of furniture, components and balustrades for flat roofs, or stairwells. Gray glass may also be used as windows for automobiles, especially rear windows, and for railroad vehicles.

Soda-lime silicate glass is in general widely manufactured in the form of a ribbon by the float process, the ribbon then being cut into the form of sheets that may subsequently be bent or undergo a treatment for enhancing the mechanical properties, for example a thermal toughening operation.

The desirable gray coloration is obtained by adding, as coloring agents, selenium and cobalt to the standard soda-lime silicate composition.

The amount of selenium and cobalt to be introduced depends on the initial iron content in the standard composition, and more particularly on the $Fe_2O_3$ content that gives the glass a yellow to green coloration. Selenium provides a pink, red or orange component depending on the oxidation state that it is in, which component is set against that of iron, thereby allowing the final color of the glass to be adjusted.

However, the use of selenium in glass compositions has several drawbacks from the industrial standpoint.

In glass, selenium exists in several stable oxidation states, some of which give the glass a particular and relatively intense coloration (for example $Se^o$ gives a pink coloration). In addition, the final color depends on the nature of the other colorants present in the glass, with which selenium can be combined: for example, $Se^{2-}$ forms a chromophore with the ferric ions, which gives the glass a red-brown coloration. To control the tint therefore requires the redox to be very precisely controlled within a relatively narrow range of values.

Next, the temperature within the furnace in which the glass batch is melted is very much greater than the selenium vaporization temperature. It follows that most of the selenium (more than 85%) is in the atmosphere of the furnace, which means that the stacks have to be equipped with electrostatic filters for retaining the selenium present in the flue gases and the dust. Added to the already very high cost of these filtration devices is the problem of recycling the dust retained by the filters, only some of which can be reintroduced into the furnace.

It has in fact been proposed to limit selenium fly-off by adding oxidizing agents to the glass batch so as to obtain oxidized forms of selenium that are more soluble in the glass. However, this method is not satisfactory since the recommended oxidizing agents are nitrates, usually sodium nitrates, which generate considerable $NO_x$ emissions as an additional source of pollution.

Finally, selenium has a high toxicity, even at low concentration, in particular when it is in the form of a selenite or selenate. Special measures are therefore necessary for handling it.

To overcome the aforementioned drawbacks, several solutions have been proposed with the aim of completely or partly eliminating selenium in glass compositions.

It has been envisioned to replace selenium with cadmium sulfide CdS and/or cadmium selenide CdSe. Under the conditions of the process, these compounds cannot be used because of their very high toxicity.

It has also been proposed to use copper, which, in colloidal ($Cu^o$ or $Cu_2O$) form gives a red-to-green coloration. However, the crystallization of copper aggregates is a tricky operation to control and furthermore requires an additional heat treatment in order to reveal the color.

In U.S. Pat. No. 5,264,400, it has been proposed to replace some of the selenium with erbium oxide $Er_2O_3$. The glass obtained has a bronze color and contains 0.2 to 0.6% iron, 0.1 to 1% $CeO_2$, 0 to 50 ppm CoO, 0 to 100 ppm NiO, 0.2 to 3% $Er_2O_3$ and 3 to 50 ppm Se.

The coloring power of erbium oxide is relatively low and the amount to be introduced into the glass is high. Moreover, erbium oxide is a compound not found widely in the natural state, and it is also found mixed with other oxides and therefore has to undergo purification treatments. Its cost is consequently very high.

U.S. Pat. No. 5,656,500 has proposed a selenium-free gray or bronze glass containing the following colorants: 0 to 0.45% $Fe_2O_3$, 0 to 0.5% $V_2O_5$, 0.5 to 2% $MnO_2$, 0 to 0.05% NiO, 0 to 0.1% CuO and 0 to 0.008% CoO.

Another solution widely reported in the literature consists of the use of nickel oxide.

JP-B-52 49010 has proposed a soda-lime silicate glass containing 0.1 to 05% $Fe_2O_3$, 0.003 to 0.02% CoO, 0.0005 to 0.0010% Se and 0 to 0.002% NiO.

EP 677 492 has disclosed a gray-to-green glass containing 0.45 to 0.95% total iron, 0.09 to 0.185% FeO, 8 to 30 ppm cobalt and at least one of the following components: Se (0-10 ppm), MnO (0-0.5%) and NiO (0-30 ppm).

FR-A-2 672 587 has disclosed a gray glass for automobiles, comprising 0.2 to 0.6% ion, 5 to 50 ppm Se, 0 to 50 ppm CoO, 0 to 100 ppm NiO, 0 to 1% $TiO_2$ and 0.1 to 1% $CeO_2$.

JP-B-56 41579, has proposed a gray glass containing 0.1 to 0.2% $Fe_2O_3$, 0.02 to 0.06% NiO, 0.001 to 0.004% CoO and 0.01 to 0.5% MnO. This glass has a shade ranging from purplish blue to purplish red.

It is an object of the present invention to propose a selenium-free gray soda-lime silicate glass composition that can be used to form windows, particularly for buildings, this composition retaining optical properties similar to those of the known compositions that contain selenium.

This object is achieved according to the present invention by the gray glass composition that comprises the following coloring agents with contents varying within the following weight limits:

| | |
|---|---|
| $Fe_2O_3$ (total iron) | 0.01 to 0.14% |
| CoO | 40 to 150 ppm |
| NiO | 200 to 700 ppm | the NiO/CoO weight ratio being between 3.5 and 6 and the glass having an overall light transmission ($TL_{D65}$) under illuminant $D_{65}$ of between 20 and 60% measured for a thickness of 6 mm.

As indicated above, a glass falling within the scope of the present invention is gray glass, that is to say it has a transmission curve as a function of the visible wavelength that is practically invariant.

In the CIE (International Lighting Commission) system, gray substances do not have a dominant wavelength and their excitation purity is zero. By extension, any substance whose curve is relatively flat in the visible range, but which nevertheless has weak absorption bands allowing a dominant wavelength to be defined, and a low but nonzero purity is generally accepted as being gray.

The gray glass according to the invention is consequently defined by its chromatic coordinates L*, a* and b* measured under the standard illuminant $D_{65}$ defined by the CIE, which represents average daylight, with UV, having a color temperature of 6500 K, allowing the optical properties of windows for buildings with a thickness of 6 mm to be evaluated. The glass according to the invention is defined as follows:

L* varies from 50 to 85, preferably 65 to 75;
a* varies from −4 to 0; and
b* varies from −5 to +3.

The use of the aforementioned coloring agents within the limits of the invention gives the desired gray coloration and also allows the optical and energy properties of the glass to be optimally adjusted.

The action of the colorants taken individually is in general well described in the literature.

The presence of iron in a glass composition may result from the raw materials, as impurities, or from an intentional addition with the aim of coloring the glass. It is known that iron exists in the form of ferric ($Fe^{3+}$) ions and ferrous ($Fe^{2+}$) ions. The presence of $Fe^{3+}$ ions gives the glass a slight yellow coloration and allows ultraviolet radiation to be absorbed. The presence of $Fe^{2+}$ ions gives the glass a more pronounced green-blue coloration and induces absorption of infrared radiation. The increase in iron content in both its forms increases the absorption of radiation at the extremities of the visible spectrum, this effect taking place to the detriment of light transmission. Conversely, by reducing the proportion of iron, particularly in $Fe^{2+}$ form, the performance in terms of energy transmission is degraded, while the light transmission increases.

In the present invention, the total iron content in the composition is between 0.01 and 0.14%, preferably between 0.07 and 0.12%. An iron content of less than 0.01% means having to have raw materials with a high degree of purity, which makes the cost of the glass much too high for use as windows in buildings. Above 0.14% iron, the glass composition does not have the desired coloration. It should be emphasized that here this is a low iron content, making it possible to produce glass by the float process in plants dedicated to the production of <<clear>> glass, in which the maximum iron content is of the order of 0.1%. By operating under such conditions, the transition time needed for switching from one glass composition to another can be reduced and also allows the total amount of energy needed to melt the glass batch to be lowered, which helps to reduce the cost of the glass.

Furthermore, the low iron content used in the compositions according to the invention makes it possible to have an a* value close to zero, that is to say one that does not give glass too green a shade. In particular, when the glass is intended to be thermally toughened, it is beneficial to have an a* value of greater than −3, as this tends to approach 0 after toughening, which means that the glass becomes even more neutral.

Cobalt produces an intense blue coloration and also decreases the light transmission. The amount must therefore be perfectly controlled in order to make the light transmission compatible with the use for which the glass is intended. According to the invention, the cobalt oxide content is between 40 and 150 ppm, preferably between 70 and 90 ppm.

Nickel oxide gives the glass a brown coloration. In the present invention, the nickel oxide content is limited to 700 ppm so as to prevent it from combining with sulfur compounds coming from the raw materials or from other compounds intentionally added, which form nickel sulfide balls. It is in fact well known that the <<high temperature>> phase of nickel sulfide, which is <<frozen in>> during thermal toughening, may progressively be transformed into a <<low temperature>> phase, the larger size of which induces mechanical stresses that shatter the glass, hence the risk of an accident. Preferably, the nickel oxide content is between 300 and 500 ppm.

By combining NiO and CoO in a weight ratio of between 3.5 and 6, it is possible to obtain the gray color that corresponds to the abovementioned chromatic coordinates. By varying the NiO/CoO, it is especially possible to adjust the b* value in the region corresponding to a blue shade, this shade proving to be particularly beneficial from the esthetic appearance standpoint.

As a general rule, it is typical to predict the optical and energy properties of a glass when it contains several coloring agents. These properties result in fact from a complex interaction between the various agents, the behavior of which is directly dependent on their oxidation state.

In the present invention, the choice of colorants, their content and their oxidation/reduction state is key in obtaining the gray coloration and the optical properties.

In particular, the redox defined by the ratio of the weight content of ferrous oxide (expressed as FeO) to the weight content of total iron (expressed as $Fe_2O_3$) varies from 0.1 to 0.3, preferably from 0.15 to 0.28, for reasons essentially associated with the melting and refining of the glass.

The redox is generally controlled using oxidizing agents such as sodium sulfate and reducing agents such as coke, the relative contents of which are adjusted in order to obtain the desired redox.

According to a first embodiment of the invention, the glass composition is characterized in that the NiO/CoO weight ratio is between 5 and 6, which allows glasses having a b* value between −1 and +2 to be obtained.

According to a second embodiment of the invention, the glass composition is characterized in that the NiO/CoO weight ratio is between 3.5 and 4.5, thus making it possible to have a b* value that varies from −5 to −1, corresponding to a bluish glass.

It has been found that by selecting the NiO/CoO ratio within the range of values indicated, it is possible for the b* value to lie between −5 and +3 before toughening, corresponding to a neutral-to-blue shade. As will be indicated later, it is particularly advantageous to control the NiO/CoO ratio in order to obtain a glass having a gray coloration after a thermal toughening step.

The composition according to the invention makes it possible to obtain a glass preferably possessing an overall light transmission $TL_{D65}$ of between 35 and 50% for a thickness of 6 mm, which makes it useful for the suppression of dazzling by sunlight.

In one embodiment of the invention, the composition contains no Se and no $MnO_2$.

In one particularly preferred embodiment of the invention, the gray glass composition comprises the following colorants in contents that vary within the following weight limits:

| | |
|---|---|
| $Fe_2O_3$ (total iron) | 0.07 to 0.12%; |

-continued

| | |
|---|---|
| CoO | 70 to 90 ppm; |
| NiO | 300 to 500 ppm. |

Using the above preferred composition, it is possible to obtain a glass whose overall light transmission ($TL_{D65}$) is between 35 and 45% for a glass thickness of 6 mm.

The term <<soda-lime silicate>> is used here in a broad sense and relates to any glass composition consisting of a glass matrix that comprises the following constituents (in percentages by weight):

| | |
|---|---|
| $SiO_2$ | 64-75% |
| $Al_2O_3$ | 0-5% |
| $B_2O_3$ | 0-5% |
| CaO | 5-15% |
| MgO | 0-10% |
| $Na_2O$ | 10-18% |
| $K_2O$ | 0-5% |
| BaO | 0-5%. |

It is recommended here that the soda-lime silicate glass composition may include, apart from the inevitable impurities contained especially in the raw materials, a small proportion (up to 1%) of other constituents, for example agents ($SO_3$, Cl, $Sb_2O_3$, $As_2O_3$) that help in melting or refining the glass or coming from the optional addition of recycled cullet into the glass batch.

In the glass according to the invention, the silica content is generally maintained within narrow limits for the following reasons. Above 75%, the viscosity of glass and its ability to devitrify greatly increase, which makes it more difficult for the glass to melt and to flow on a bath of molten tin. Below 64%, the hydrolytic resistance of the glass rapidly decreases, and the transmission in the visible also decreases.

The alkali metal oxides $Na_2O$ and $K_2O$ facilitate melting of the glass and allow its viscosity at high temperatures to be adjusted so as to keep it close to that of a standard glass. $K_2O$ can be used up to 5%, as above this the problem of the high cost of the composition arises. Moreover, the $K_2O$ content may be increased, but, for the most part, only to the detriment of the $Na_2O$ content, which helps to increase the viscosity. The sum of the $Na_2O$ and $K_2O$ contents, expressed as percentages by weight, is preferably equal to or greater than 10% and advantageously less than 20%. If the sum of these contents is greater than 20% or if the $Na_2O$ content is greater than 18%, the hydrolytic resistance is greatly reduced.

Alkaline-earth metal oxides allow the viscosity of the glass to be matched to the production conditions.

MgO may be used up to about 10% and its omission may be at least partly compensated for by an increase in the $Na_2O$ content and/or the $SiO_2$ content. Preferably, the MgO content is less than 5% and particularly advantageously is less than 2%, which has the effect of increasing the infrared absorption capacity without impairing the transmission in the visible.

BaO allows the light transmission to be increased and it can be added to the composition with a content of less than 5%.

BaO has a much smaller effect than CaO and MgO on the viscosity of the glass and an increase in its content is essentially to the detriment of the alkaline-earth oxides, MgO and most particularly CaO. Any increase in BaO helps to increase the viscosity of the glass at low temperatures. Preferably, the glass according to the invention contains no BaO.

Apart from complying with the limits defined above or the variation in the content of each alkaline-earth metal oxide, it is preferable in order to obtain the desired transmission properties to limit the sum of the MgO, CaO and BaO weight contents to a value of 15% or less.

The composition according to the invention may furthermore include additives, for example agents that modify the optical properties within certain parts of the spectrum, especially within the ultraviolet range, such as $CeO_2$, $TiO_2$, $WO_3$, $La_2O_3$ and $V_2O_5$. The total content of these additives does not in general exceed 2% by weight of the composition, and preferably does not exceed 1%.

The glass composition according to the invention can be melted under float glass and rolled glass production conditions. The melting generally takes place in fired furnaces, optionally provided with electrodes for heating the glass through the bulk by passing an electric current between the two electrodes. To facilitate melting, and especially to make this mechanically beneficial, the glass composition advantageously has a temperature corresponding to a viscosity η such that log η=2 which is less than 1500° C. More preferably, the temperature corresponding to the viscosity η such that log η=3.5 (denoted by T(log η=3.5)) and the liquidous temperature (denoted by $T_{liq}$) satisfy the equation:

$$T_{log\ \eta=3.5} - T_{liq} > 20°\ C.$$

and better still:

$$T_{log\ \eta=3.5} - T_{liq} > 50°\ C.$$

The thickness of the glass sheet formed generally varies between 2 and 19 mm.

In the float process, the thickness of the ribbon obtained by sheeting out the molten glass on the tin bath preferably varies between 3 and 10 mm for glazing intended for buildings.

By rolling, the thickness of the glass preferably varies between 4 and 10 mm.

The glass sheet obtained by cutting the glass ribbon may subsequently undergo a bending and/or toughening operation.

Thermal toughening is a well-known operation that consists in heating the glass sheet to a temperature of around 600 to 700° C. for a time that does not generally exceed a few minutes and in suddenly cooling it, for example by pressurized air jets.

The toughened glass sheet obtained from the composition according to the invention is noteworthy in that it has a gray coloration characterized in particular by an a* value varying from −2 to 0 and a b* value varying from −10 to +2, preferably from −4 to 0.

Under the thermal toughening conditions, the variation in the color of the glass is adjusted by the relative NiO content. It has been found that, in the toughened glass, the chemical environment of the nickel is modified, giving it different absorption properties. This results in an increase in the a* value and a decrease in the b* value. These changes are greater the higher the NiO content.

The glass sheet obtained may also undergo other subsequent treatment operations, for example for the purpose of coating it with one or more metal oxide films for the purpose of reducing its heat-up by solar radiation.

The glass sheet according to the invention has high solar radiation transmission values due to the low iron content. However, the transmission may be easily reduced by coating that surface of the glass which is exposed to the solar radiation with one or more films of at least one metal oxide, for example silver oxide, which has the effect of reflecting infrared radiation without appreciably modifying the color of the glass.

The optionally toughened glass sheet can be used as such or can be combined with another glass sheet to form glazing for buildings.

The examples of the glass compositions given below give a better appreciation of the advantages of the present invention.

In these examples, the values of the following properties measured for a glass thickness of 6 mm are indicated:

the overall light transmission factor ($TL_{D65}$) under illuminant $D_{65}$ measured between 380 and 780 nm and calculated according to the EN 410 standard, together with the chromatic coordinates $L^*$, $a^*$ and $b^*$. The calculations are carried out taking the CIE 1931 calorimetric reference observer;

the redox defined as the ratio of FeO to total iron expressed in the form of $Fe_2O_3$. The total iron content is measured by X-ray fluorescence and the FeO content is measured using wet chemistry.

Each of the compositions given in Table 1 was produced from the following glass matrix, the contents of which are expressed in percentages by weight, this being corrected as regards silica in order to be matched to the total content of coloring agents added:

| | |
|---|---|
| $SiO_2$ | 71% |
| $Al_2O_3$ | 0.70% |
| CaO | 8.90% |
| MgO | 3.80% |
| $Na_2O$ | 14.10% |
| $K_2O$ | 0.10%. |

The glass obtained was thermally toughened in a furnace at 600-700° C. for 1 to 3 minutes, and was then cooled by nozzles blasting air at a pressure of 1 bar (0.1 MPa) for 1 minute.

All the glass compositions according to the invention (examples 1 to 14) were characterized by an overall light transmission ($TL_{D65}$) of between 20 and 60% and a gray coloration, these characteristics being comparable to those obtained with a glass containing selenium (comparative example 2). However, the markedly lower iron content than in comparative example 1 allows the composition to be used in <<clear>> glass plants as indicated above.

Compared with the gray glass of comparative example 1 without selenium but containing nickel oxide, the glass compositions of the invention have a more neutral gray coloration before and after the thermal toughening step. This results from the lower iron content.

TABLE 1

| | Comparative example 1 | Comparative example 2 | Example 1 | Example 2 | Example 3 | Example 4 | Example 5 | Example 6 |
|---|---|---|---|---|---|---|---|---|
| $Fe_2O_3$ (%) | 0.3000 | 0.4600 | 0.1400 | 0.0800 | 0.0800 | 0.0400 | 0.0380 | 0.0640 |
| Redox | 0.20 | 0.18 | 0.18 | 0.14 | 0.19 | 0.17 | 0.19 | 0.25 |
| CoO (ppm) | 64 | 69 | 120 | 80 | 70 | 46 | 65 | 135 |
| NiO (ppm) | 410 | — | 480 | 350 | 400 | 245 | 300 | 680 |
| Se (ppm) | — | 14 | — | — | — | — | — | — |
| NiO/CoO | 6.4 | 0.0 | 4.0 | 4.4 | 5.7 | 5.3 | 4.6 | 5.0 |
| Before toughening | | | | | | | | |
| $TL_{D65}$ (%) | 40.3 | 43.7 | 30.0 | 42.5 | 42.4 | 56.5 | 48.6 | 23.3 |
| $L^*$ | 69.7 | 72.1 | 61.6 | 71.2 | 71.2 | 79.9 | 75.2 | 55.4 |
| $a^*$ | −5.5 | −0.1 | −3.9 | −3.0 | −3.2 | −2.1 | −2.5 | −3.7 |
| $b^*$ | 3.6 | −2.1 | −4.6 | −2.0 | 1.8 | 0.6 | −1.2 | −0.7 |
| After toughening | | | | | | | | |
| $TL_{D65}$ (%) | 36.7 | — | 26.9 | 39.3 | 38.8 | 53.5 | 45.4 | 20.0 |
| $L^*$ | 67.1 | — | 58.9 | 69.0 | 68.6 | 78.1 | 73.2 | 51.9 |
| $a^*$ | −3.3 | — | −1.0 | −0.9 | −1.0 | −0.7 | −0.7 | −0.1 |
| $b^*$ | −0.3 | — | −8.8 | −5.5 | −2.1 | −2.0 | −4.3 | −6.3 |

| | Example 7 | Example 8 | Example 9 | Example 10 | Example 11 | Example 12 | Example 13 | Example 14 |
|---|---|---|---|---|---|---|---|---|
| $Fe_2O_3$ (%) | 0.0120 | 0.1240 | 0.0950 | 0.0280 | 0.0900 | 0.0850 | 0.0900 | 0.0900 |
| Redox | 0.17 | 0.26 | 0.18 | 0.20 | 0.18 | 0.19 | 0.15 | 0.12 |
| CoO (ppm) | 90 | 75 | 65 | 110 | 75 | 85 | 74 | 80 |
| NiO (ppm) | 390 | 398 | 318 | 560 | 290 | 460 | 350 | 370 |
| Se (ppm) | — | — | — | — | — | — | — | — |
| NiO/CoO | 4.3 | 5.3 | 4.9 | 5.1 | 3.9 | 5.4 | 4.7 | 4.6 |
| Before toughening | | | | | | | | |
| $TL_{D65}$ (%) | 39.5 | 40.5 | 46.9 | 30.2 | 45.9 | 37.0 | 43.7 | 41.7 |
| $L^*$ | 69.1 | 69.8 | 74.1 | 61.8 | 73.5 | 67.3 | 72.0 | 70.6 |
| $a^*$ | −2.5 | −4.0 | −3.1 | −3.1 | −3.0 | −3.4 | −3.1 | −3.0 |
| $b^*$ | −2.7 | 0.4 | −0.3 | −0.2 | −3.6 | 1.0 | −0.8 | −1.1 |
| After toughening | | | | | | | | |
| $TL_{D65}$ (%) | 36.3 | 37.0 | 43.7 | 26.6 | 43.0 | 33.4 | 40.4 | 38.4 |
| $L^*$ | 66.7 | 67.3 | 72.0 | 58.6 | 71.6 | 64.5 | 69.7 | 68.3 |

TABLE 1-continued

| | | | | | | | | |
|---|---|---|---|---|---|---|---|---|
| a* | −0.2 | −1.7 | −1.2 | −0.1 | −1.2 | −0.9 | −1.0 | −0.9 |
| b* | −6.5 | −3.4 | −3.5 | −5.2 | −6.5 | −3.3 | −4.2 | −4.7 |

The invention claimed is:

1. A gray soda-lime silicate glass composition, comprising the following coloring agents with contents varying within the following weight limits:

| | |
|---|---|
| $Fe_2O_3$ (total iron) | 0.01 to 0.14%; |
| CoO | 40 to 150 ppm; and |
| NiO | 200 to 700 ppm; | wherein:
the NiO/CoO weight ratio is between 3.5 and 6; and
the glass has an overall light transmission ($TL_{D65}$) under illuminant $D_{65}$ of between 20 and 60% measured at a thickness of 6 mm.

2. The composition as claimed in claim 1, wherein the light transmission $TL_{D65}$ is between 35 and 50%, preferably between 35 and 50%.

3. The composition as claimed in claim 1, wherein the glass has the following chromatic coordinates measured under illuminant $D_{65}$ at a thickness of 6 mm:
L* varies from 50 to 85;
a* varies from −4 to 0; and
b* varies from −5 to +3.

4. The composition as claimed in claim 1 wherein:
the NiO/CoO weight ratio is between 3.5 and 4.5; and
the glass has a chromatic coordinate b* of between −5 and −1, measured under illuminant $D_{65}$ at a thickness of 6 mm.

5. The composition as claimed in claim 1, wherein:
the NiO/CoO weight ratio is between 5 and 6; and
the glass has a chromatic coordinate b* of between −1 and +2, measured under illuminant $D_{65}$ at a thickness of 6 mm.

6. The composition as claimed in claim 1, wherein the composition comprises the following colorants in contents that vary within the following weight limits:

| | |
|---|---|
| $Fe_2O_3$ (total iron) | 0.07 to 0.12%; |
| CoO | 70 to 90 ppm; |
| NiO | 300 to 500 ppm. |

7. The composition as claimed in claim 1, wherein the redox varies from 0.1 to 0.3.

8. The composition as claimed in claim 1, wherein the composition contains no Se and no $MnO_2$.

9. The composition as claimed in claim 1, wherein the composition consists of a glass matrix that comprises the following constituents (in percentages by weight):

| | |
|---|---|
| $SiO_2$ | 64-75% |
| $Al_2O_3$ | 0-5% |
| $B_2O_3$ | 0-5% |
| CaO | 5-15% |
| MgO | 0-10% |
| $Na_2O$ | 10-18% |

-continued

| | |
|---|---|
| $K_2O$ | 0-5% |
| BaO | 0-5%. |

10. A glass sheet formed by the float process on a bath of molten metal, or by rolling, with a chemical composition as defined by claim 1.

11. A thermally toughened glass sheet, comprising:
the composition as claimed in claim 1;
the sheet having the following chromatic coordinates measured under illuminant $D_{65}$ at a thickness of 6 mm:
a* varies from −2 to 0;
b* varies from −10 to +2.

12. The glass sheet as claimed in claim 10, wherein the glass sheet has a thickness of between 2 and 19 mm.

13. The glass sheet as claimed in claim 10, wherein the glass sheet further comprises at least one film of at least one metal oxide for reflecting infrared radiation.

14. A glazing, wherein the glazing comprises at least one glass sheet as claimed in claim 10.

15. The thermally toughened glass sheet as claimed in claim 11, wherein the thermally toughened glass sheet has a thickness of between 2 and 19 mm.

16. The thermally toughened glass sheet as claimed in claim 11, wherein the thermally toughened glass sheet further comprises at least one film of at least one metal oxide for reflecting infrared radiation.

17. A glazing, wherein the glazing comprises at least one glass sheet as claimed in claim 11.

18. A building glazing comprising the glass sheet as claimed in claim 10.

19. A building glazing comprising the thermally toughened glass sheet as claimed in claim 11.

20. The composition as claimed in claim 1, wherein the light transmission $TL_{D65}$ is between 35 and 45%.

21. The composition as claimed in claim 1, wherein the glass has the following chromatic coordinates measured under illuminant $D_{65}$:
L* varies from 65 to 75;
a* varies from −4 to 0; and
b* varies from −5 to +3.

22. The composition as claimed in claim 1, wherein the redox varies from 0.15 to 0.28.

23. A thermally toughened glass sheet, comprising:
the composition as claimed in claim 1;
the sheet having the following chromatic coordinates measured under illuminant $D_{65}$ at a thickness of 6 mm:
a* varies from −2 to 0;
b* varies from −4 to 0.

* * * * *